(12) United States Patent
Zhou et al.

(10) Patent No.: US 9,369,292 B2
(45) Date of Patent: Jun. 14, 2016

(54) INFORMATION TRANSMISSION METHOD, PACKET DATA GATEWAY, AND POLICY AND CHARGING RULES FUNCTION

(75) Inventors: Xiaoyun Zhou, Shenzhen (CN); Zaifeng Zong, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 130 days.

(21) Appl. No.: 14/238,350

(22) PCT Filed: Jul. 23, 2012

(86) PCT No.: PCT/CN2012/079031
§ 371 (c)(1),
(2), (4) Date: Feb. 11, 2014

(87) PCT Pub. No.: WO2013/020448
PCT Pub. Date: Feb. 14, 2013

(65) Prior Publication Data
US 2014/0198728 A1    Jul. 17, 2014

(30) Foreign Application Priority Data

Aug. 11, 2011  (CN) .......................... 2011 1 0230087

(51) Int. Cl.
*H04L 12/14*    (2006.01)
*H04W 88/16*    (2009.01)
(Continued)

(52) U.S. Cl.
CPC ........ *H04L 12/1407* (2013.01); *H04L 41/0893* (2013.01); *H04L 61/2007* (2013.01);
(Continued)

(58) Field of Classification Search
CPC ..... H04W 12/02; H04W 12/04; H04W 12/06; H04L 29/06068; H04L 29/06095; H04L 29/06102; H04L 12/1407; H04L 41/0893; H04L 61/2007; H04L 61/2514; H04L 61/6086; H04L 63/0272; H04L 63/164; H04L 63/0435
See application file for complete search history.

(56) References Cited

U.S. PATENT DOCUMENTS

2009/0129373 A1   5/2009  Eguchi
2009/0182883 A1*  7/2009  Giaretta ................ G06Q 40/00
                                              709/228
(Continued)

FOREIGN PATENT DOCUMENTS

| CN | 1835474 | 9/2006 |
|---|---|---|
| CN | 101232442 | 7/2008 |
| CN | 101911588 | 12/2010 |

OTHER PUBLICATIONS

Extended European Search Report mailed Mar. 30, 2015 in European Patent Application 12 822 913.5.
(Continued)

*Primary Examiner* — Candal Elpenord
(74) *Attorney, Agent, or Firm* — Plumsea Law Group, LLC

(57) ABSTRACT

Disclosed are an information transmission method, a packet data gateway, and a policy and charging rules function. The method includes: after receiving a Mobile IPv6 support for Dual Stack Hosts and Routers (DSMIPv6) binding update signaling, a packet data network gateway (P-GW) notifying a source User Datagram Protocol (UDP) port number of the DSMIPv6 binding update signaling to a Policy and Charging Rules Function (PCRF); and the PCRF notifying the source UDP port number of the DSMIPv6 binding update signaling to a fixed broadband access network. The above-mentioned method provides the UDP port number for the fixed broadband access network according to whether the IPSec capsulation is performed on the user plane data, which makes the fixed broadband access network be able to identify the user plane data of the user equipment correctly and perform a corresponding policy control.

15 Claims, 8 Drawing Sheets

(51) Int. Cl.
*H04L 12/24* (2006.01)
*H04W 12/02* (2009.01)
*H04L 29/12* (2006.01)
*H04L 29/06* (2006.01)
*H04W 80/04* (2009.01)

(52) U.S. Cl.
CPC ........ *H04L61/2514* (2013.01); *H04L 61/6086* (2013.01); *H04W 12/02* (2013.01); *H04L 29/06068* (2013.01); *H04L 63/0272* (2013.01); *H04L 63/0435* (2013.01); *H04L 63/164* (2013.01); *H04W 80/045* (2013.01); *H04W 88/16* (2013.01)

(56) References Cited

U.S. PATENT DOCUMENTS

| | | | | |
|---|---|---|---|---|
| 2009/0199268 A1* | 8/2009 | Ahmavaara | | H04L 12/4633 726/1 |
| 2009/0207823 A1* | 8/2009 | Andreasen | | H04L 12/1403 370/338 |
| 2009/0300207 A1* | 12/2009 | Giaretta | | H04L 12/1403 709/232 |
| 2010/0189103 A1* | 7/2010 | Bachmann | | H04L 69/04 370/389 |
| 2013/0016677 A1* | 1/2013 | Kunz | | H04W 76/022 370/329 |

OTHER PUBLICATIONS

3GPP, 3rd Generation Partnership Project; Technical Specification Group Core Network and Terminals; EGPP System-Fixed Broadband Access Network Interworking; Stage 2 (Release 11), Generation Partnership Project, Mobile Competence Centre, France, vol. SA WG2; May 30, 2011.

"Mobile IPv6 Support for Dual Stack Hosts and Routers; rfc5555. txt", Soliman et al., Internet Engineering Task Force; Internet Society 4, Geneva, Switzerland; Jun. 1, 2009.

* cited by examiner

INFORMATION TRANSMISSION METHOD, PACKET DATA GATEWAY, AND POLICY AND CHARGING RULES FUNCTION

TECHNICAL FIELD

The present document relates to the 3GPP and the broadband forum (BBF) technology, and in particular, to an information transmission method, a packet data gateway, and a policy and charging rules function.

BACKGROUND OF THE RELATED ART

FIG. 1 is a composition framework diagram of the existing 3rd Generation Partnership Project (3GPP) Evolved Packet System (EPS). The EPS network framework in a non-roaming scene as shown in FIG. 1 includes an Evolved Universal Terrestrial Radio Access Network (E-UTRAN), a Mobility Management Entity (MME), a Serving Gateway (S-GW), a Packet Data Network Gateway (P-GW, and also called PDN GW), a Home Subscriber Server (HSS), a Policy and Charging Rules Function (PCRF) Entity and other supporting nodes.

Wherein, the PCRF is the core of the policy and charging control (PCC), taking charge of formulating the policy decision and charging rules. The PCRF provides the network control rules based on the service data flow, and those network controls include detection, Gating Control and the Quality of Service (QoS) control of the service data flow, and the charging rules based on the data flow, etc. The PCRF sends the policy and the charging rules defined by itself to the policy and charging execution function (PCEF) to carry out, and meanwhile, the PCRF also needs to guarantee that these rules keep consistent with the user signing information. The regular basis for the PCRF formulating the policy and charging rules includes: obtaining the information correlated to the service from the AF; obtaining the user policy and charging control signing information from the Subscription Profile Repository (SPR); and obtaining the information of the network related to bearing from the PCEF.

The EPS supports the intercommunication with the non-3GPP system, and the intercommunication between the EPS and the non-3GPP system is realized through the S2a/b/c interface, and the P-GW is the anchor point between the EPS and the non-3GPP system. As shown in FIG. 1, wherein, the non-3GPP system is divided into a trusted non-3GPP IP access and an untrusted 3GPP IP access. The trusted non-3GPP IP access can be connected to the P-GW through the S2a interface directly; the untrusted non-3GPP IP needs to be connected to the P-GW through the Evolved Packet Data Gateway (ePDG); the interface between the ePDG and the P-GW is an S2b interface, and the signaling and the data are enciphered and protected by adopting the Internet protocol security (IPSec) between the UE and the ePDG. The S2c interface provides the user plane related control and the mobility support between the User Equipment (UE) and the P-GW, and the mobility management protocol supported by itself is the Mobile IPv6 support for dual stack Hosts and Routers (DSMIPv6).

At present, a lot of operators pay close attention to the Fixed Mobile Convergence (FMC), and carry on research of the interconnection and interflow of the 3GPP and broadband forum (BBF). In the scene that the user gets access to the mobile core network through the fixed broadband access network, the QoS on the whole transmission path of the data (the data will be transmitted through the fixed network and the mobile network) needs to be guaranteed. In the current technology, the QoS guarantee is realized through the interaction between the PCRF and the Broadband Policy Control Framework (BPCF) of the fixed broadband access network. The BPCF is the policy control framework of the fixed broadband access network. For the resource request message of the PCRF, the BPCF performs the resource admission control or forwards the resource request messages to other network elements of the fixed broadband access network (such as, IP Edge) according to the network policy and signing information, etc. of the fixed broadband access network, and then other network elements performs the resource admission control (that is, other network elements are entrusted to perform the resource admission control). For example, when the UE gets access to the 3GPP core network through the Wireless Local Area Network (WLAN), in order to guarantee that the overall bandwidth requirement of visiting services of all UEs which access through one WLAN access line does not exceed the bandwidth of that line (such as, the signing bandwidth or the maximum bandwidth supported by that line). The PCRF needs to interact with the BPCF when performing the QoS authorization, so that the fixed broadband access network carries out the resource admission control.

FIG. 2a is a framework diagram of the UE accessing the 3GPP core network by adopting the DSMIPv6 protocol through the fixed broadband access network in the scene of the policy intercommunication between the 3GPP network and the fixed broadband access network in the related technology, wherein, the fixed broadband access network is a trusted non-3GPP access network, and there is a network address translation (abbreviated as NAT) between the UE and the P-GW, and usually that NAT lies in the Residential Gateway (RG). The IP Edge can be a BNG or a BRAS. The PCRF interacts with the IP Edge through the BPCF. FIG. 2b is a framework diagram of the UE accessing the 3GPP core network by adopting the DSMIPv6 protocol through the fixed broadband access network in the scene of the policy convergence between the 3GPP network and the fixed broadband access network in the related technology, wherein, the fixed broadband access network is a trusted non-3GPP access network, and there is an NAT between the UE and the P-GW, and usually this NAT lies in the RG. The IP Edge can be a BNG or a BRAS. The PCRF interacts with the IP Edge directly.

FIG. 3 is an adherence procedure of the UE accessing the 3GPP core network by adopting the DSMIPv6 protocol through the fixed broadband access network in the scene of the policy intercommunication, wherein, the fixed broadband access network is the trusted non-3GPP access network.

In step 301, the UE may carry out the access authentication procedure which is based on the 3GPP and participated by the fixed broadband access network;

in step 302, the UE obtains the local IP address from the fixed broadband access network as the care of address (CoA) of the UE;

in step 303, triggered by step 301 and step 302, the BPCF acquires that the UE is accessing the fixed broadband access network;

in step 304, after receiving the triggering, the BPCF initiates a gateway control session establishment procedure to the PCRF to establish the gateway control session, and the BPCF includes the user identification and the IP connection access network (IP-CAN) type in the message;

steps 301~304 are optional steps and are performed when the UE performs the access authentication procedure which is based on the 3GPP and participated by the fixed broadband access network;

in step 305, the UE carries out the Bootstrapping procedure; the UE finds the P-GW, and in order to protect the DSMIPv6 message between the UE and the P-GW, the UE uses the IKEv2 to establishes the security association, and adopts the extendible identity authentication protocol (EAP) for authentication; the P-GW performs the communication with the Authentication, Authorization and Accounting server (AAA Server) (the AAA Server further interacts with the HSS) to finish the EAP authentication, and the P-GW distributes an IPv6 address prefix for the UE at the same time, and the UE constructs an IPv6 address as the home address (HoA) of the UE according to that prefix;

when the UE uses the IKEv2 to establish the security association with the P-GW, the source address for the UE sending the IKEv2 signaling is the IP Address1 (that is, the local IP address obtained in step 302), and the source UDP port number is Port1 (usually, the value is 500). There is an NAT between the UE and the P-GW, so the source address and source UDP port number of the IKEv2 signaling received by the P-GW are already changed. The source address of the IKEv2 signaling received by the P-GW is IP Address2, and the source UDP port number is Port2. In order to describe easily, the source address of the UE obtained by the P-GW is also called the local IP address of the UE. Because there is the NAT, then the local IP address and the source UDP port number of the UE of the IKEv2 signaling receive by the P-GW (also called the IPSec source UDP port number) can be used for identifying the data of the UE by the fixed broadband access network.

In step 306, the UE sends the DSMIPv6 binding update message to the P-GW, carrying the HoA and the CoA;

in step 307, the P-GW sends an IP-CAN session establishment indication message to the PCRF to establish a Gx session, and the message carries the user identification, the HoA, the UE local IP address (that is, CoA, and the CoA is a source address of the UE received by the P-GW on which the NAT is performed) and the IPSec source UDP port number (that is, Port2);

in step 308, if steps 301~304 are carried out, the PCRF correlates the gateway control session established in step 304 with the Gx session established in step 307 according to the UE local IP address (that is, the CoA) or the user identification; the PCRF formulates the PCC rules and the QoS rules; and the PCRF returns confirmation message to the PCEF, the message carries the PCC rules;

in step 309, the P-GW returns the binding confirmation message to the UE;

in step 310, if steps 301~304 are not performed, then the PCRF determines the entry point of the BPCF of the fixed broadband access network accessed by the UE at present according to the UE local IP address (that is, the CoA), and initiates the gateway control session establishment procedure initiated by the PCRF to establish the gateway control session, and the message carries the UE local IP address and the IPSec source UDP port number.

However, there are the following problems in the related art: (1). Whether IPSec capsulation needs to be performed on the user plane data of the DSMIPv6 is optional, therefore when there is an NAT between the UE and the P-GW, for the user plane data on which the IPSec capsulation is performed or is not performed, the source UDP port numbers of the user plane data are different after NAT traversing is performed; in the related art, only the UDP port number after the IKEv2 traversing is performed, (that is, the IPSec source UDP port number), is notified to the fixed broadband access network, and that the fixed broadband access network totally identifies the user plane data of the UE can not be realized; (2). After the above-mentioned procedures step 301~step 304 are performed, the PCRF does not provide any source UDP port number for the fixed broadband access network, which makes the fixed broadband access network be unable to identify the data of the UE after step 301~step 304 are performed.

Likewise, the above-mentioned problems exist in the policy convergence scene as well.

SUMMARY OF THE INVENTION

The embodiments of the present document provide an information transmission method, a packet data gateway and a policy and charging rules function, which makes the fixed broadband access network be able to identify the data of the UE.

In order to solve the above-mentioned technical problem, an information transmission method of the present document comprises:

after receiving a Mobile IPv6 support for Dual Stack Hosts and Routers (DSMIPv6) binding update signaling, a packet data network gate way (P-GW) notifying a source User Datagram Protocol (UDP) port number of the DSMIPv6 binding update signaling to a Policy and Charging Rules Function (PCRF); and the PCRF notifying the source UDP port number of the DSMIPv6 binding update signaling to a fixed broadband access network.

In the step of notifying a source UDP port number of the DSMIPv6 binding update signaling to a PCRF, the P-GW further notifies an Internet protocol security (IPSec) source UDP port number to the PCRF; and in the step of notifying the source UDP port number of the DSMIPv6 binding update signaling to a fixed broadband access network, the PCRF further notifies the IPSec source UDP port number to the fixed broadband access network.

The method further comprises: the P-GW notifying the IPSec source UDP port number to the PCRF after a user equipment or the P-GW itself triggers to establish a child IPSec security association; and the PCRF notifying the IPSec source UDP port number to the fixed broadband access network.

The method further comprises: after the fixed broadband access network receives the IPSec source UDP port number, adopting the IPSec source UDP port number to replace the source UDP port number of the DSMIPv6 binding update signaling, or adding the IPSec source UDP port number.

The step of a P-GW notifying a source UDP port number of the DSMIPv6 binding update signaling to a PCRF comprises: the P-GW sending tunnel header information to the PCRF, comprising the source UPD port number of the DSMIPv6 binding update signaling; and the step of the PCRF notifying the source UDP port number of the DSMIPv6 binding update signaling to the fixed broadband access network comprises: the PCRF obtaining the source UDP port number of the DSMIPv6 binding update signaling and notifying the source UDP port number of the DSMIPv6 binding update signaling to the fixed broadband access network.

The method further comprises: the P-GW sending the tunnel header information or user plane data of the user equipment to the PCRF, to notify the PCRF to perform IPSec capsulation; and the step of the PCRF notifying the IPSec source UDP port number to the fixed broadband access network comprises: after the PCRF analyzes according to the tunnel header information and acquires that IPSec capsulation is performed on the user plane data of the user equipment, notifying the IPSec source UDP port number to the fixed broadband access network; or performing the IPSec capsulation according to the user plane data of the user equipment sent by the P-GW and notifying the IPSec source UDP port number to the fixed broadband access network.

The method further comprises: the P-GW notifying the source UDP port number of the DSMIPv6 binding update signaling to the PCRF after the user equipment or the P-GW itself triggers to delete the Child IPSec security association; and the PCRF notifying the source UDP port number of the DSMIPv6 binding update signaling to the fixed broad Band access network, to replace the IPSec source UDP port number.

In the step of notifying the source UDP port number of the DSMIPv6 binding update signaling to the PCRF, the P-GW further notifies the IPSec source UDP port number to the PCRF; and the PCRF notifies the source UDP port number of the DSMIPv6 binding update signaling to the fixed broadband access network after analyzing and acquiring that the IPSec capsulation is not performed on the user plane data of the user equipment.

In the step of notifying the source UDP port number of the DSMIPv6 binding update signaling to the PCRF, the P-GW further notifies the IPSec source UDP port number to the PCRF, and notifies the PCRF that the IPSec capsulation is not performed on the user plane data of the user equipment; and the PCRF notifies the source UDP port number of the DSMIPv6 binding update signaling to the fixed broadband access network after acquiring that the IPSec capsulation is not performed on the user plane data of the user equipment.

The step of the PCRF notifying the source UDP port number of the DSMIPv6 binding update signaling to the fixed broadband access network comprises:

when the PCRF does not establish the gateway control session yet, sending message of establishing the gateway control session to the fixed broadband access network, wherein, the message carries the source UDP port number of the DSMIPv6 binding update signaling; and when the PCRF has established the gateway control session, notifying the source UDP port number of the DSMIPv6 binding update signaling to the fixed broadband access network through the gateway control session.

The step of the PCRF notifying the source UDP port number of the DSMIPv6 binding update signaling and the IPSec source UDP port number to the fixed broadband access network comprises:

when the PCRF does not establish the gateway control session yet, sending message of establishing the gateway control session to the fixed broadband access network, wherein, the message carries the source UDP port number of the DSMIPv6 binding update signaling and the IPSec source UDP port number; and when the PCRF has established the gateway control session, notifying the source UDP port number of the DSMIPv6 binding update signaling and the IPSec source UDP port number to the fixed broadband access network through the gateway control session.

In order to solve the above-mentioned technical problem, a packet data network gateway of the present document comprises a signaling receiving unit, a signaling analysis unit and an information sending unit, wherein:

the signaling receiving unit is configured to receive a Mobile IPv6 support for Dual Stack Hosts and Routers (DSMIPv6) binding update signaling, the signaling analysis unit is configured to analyze the DSMIPv6 binding update signaling; and the information sending unit is configured to notify a source User Datagram Protocol (UDP) port number of the DSMIPv6 binding update signaling to a Policy and Charging Rules Function (PCRF).

The information sending unit is further configured to notify an Internet protocol security (IPSec) source UDP port number to the PCRF when notifying the source UDP port number of the DSMIPv6 binding update signaling to the PCRF.

The information sending unit is further configured to notify the IPSec source UDP port number to the PCRF after a user equipment or the packet data network gateway triggers to establish a Child IPSec security association; and notify the source UDP port number of the DSMIPv6 binding update signaling to the PCRF after the user equipment or the packet data network gateway deletes the Child IPSec security association.

In order to solve the above-mentioned technical problem, a policy and charging rules function of the present document comprises an information receiving unit and an information distribution unit, wherein, the information receiving unit is configured to receive a source User Datagram Protocol (UDP) port number of a Mobile IPv6 support for dual stack Hosts and Routers (DSMIPv6) binding update signaling from a packet data network gateway (P-GW); and the information distribution unit is configured to notify the source UDP port number of the DSMIPv6 binding update signaling to a fixed broadband access network.

The information receiving unit is further configured to receive an internet protocol security (IPSec) source UDP port number when receiving the source UDP port number of the DSMIPv6 binding update signaling; and the information distribution unit is further configured to notify the IPSec source UDP port number to the fixed broadband access network when notifying the source UDP port number of the DSMIPv6 binding update signaling to the fixed broadband access network.

In order to solve the above-mentioned technical problem, an IP Edge of the present document is used as a network element of a fixed broadband network access network, comprising: an information receiving unit and an execution unit, wherein:

the information receiving unit is configured to receive a source User Datagram Protocol (UDP) port number of a Mobile IPv6 support for dual stack Hosts and Routers (DSMIPv6) binding update signaling from a policy and charging rules function (PCRF); and the execution unit is configured to perform identification and policy control on user plane data according to the source UDP port number of the DSMIPv6 binding update signaling obtained.

The information receiving unit is further configured to receive an internet protocol security (IPSec) source UDP port number when receiving the source UDP port number of the DSMIPv6 binding update signaling; and the execution unit is further configured to perform identification and policy control on the user plane data according to the IPSec source UDP port number obtained.

The information receiving unit is configured to obtain the source UDP port number of the DSMIPv6 binding update signaling or the IPSec source UDP port number from the PCRF directly or through a broadband policy control framework (BPCF).

In sum, the present document provides the UDP port number for the fixed broadband access network according to whether IPSec capsulation is performed on the user plane data, to make the fixed broadband access network be able to identify the user plane data of the user equipment correctly, and perform the corresponding policy control.

PREFERRED EMBODIMENTS OF THE INVENTION

The 3GPP network provides a UDP port number to a BPCF according to whether IPSec capsulation is performed on the user plane data in the present embodiment. When IPSec capsulation is not performed on the user plane data, the 3GPP network provides the source UDP port number of the DSMIPv6 binding update signaling for the fixed broadband access network; when IPSec capsulation is performed on the user plane data, the 3GPP network provides the IPSec source UDP port number for the fixed broadband access network.

The source UDP port number of the DSMIPv6 binding update signaling can also be provide for the fixed broadband access network when IPSec capsulation is not performed on the user plane data; and the source UDP port number of the DSMIPv6 binding update signaling and the IPSec source UDP port number are provided for the fixed broadband access network when IPSec capsulation is performed on the user plane data.

Figure 1:
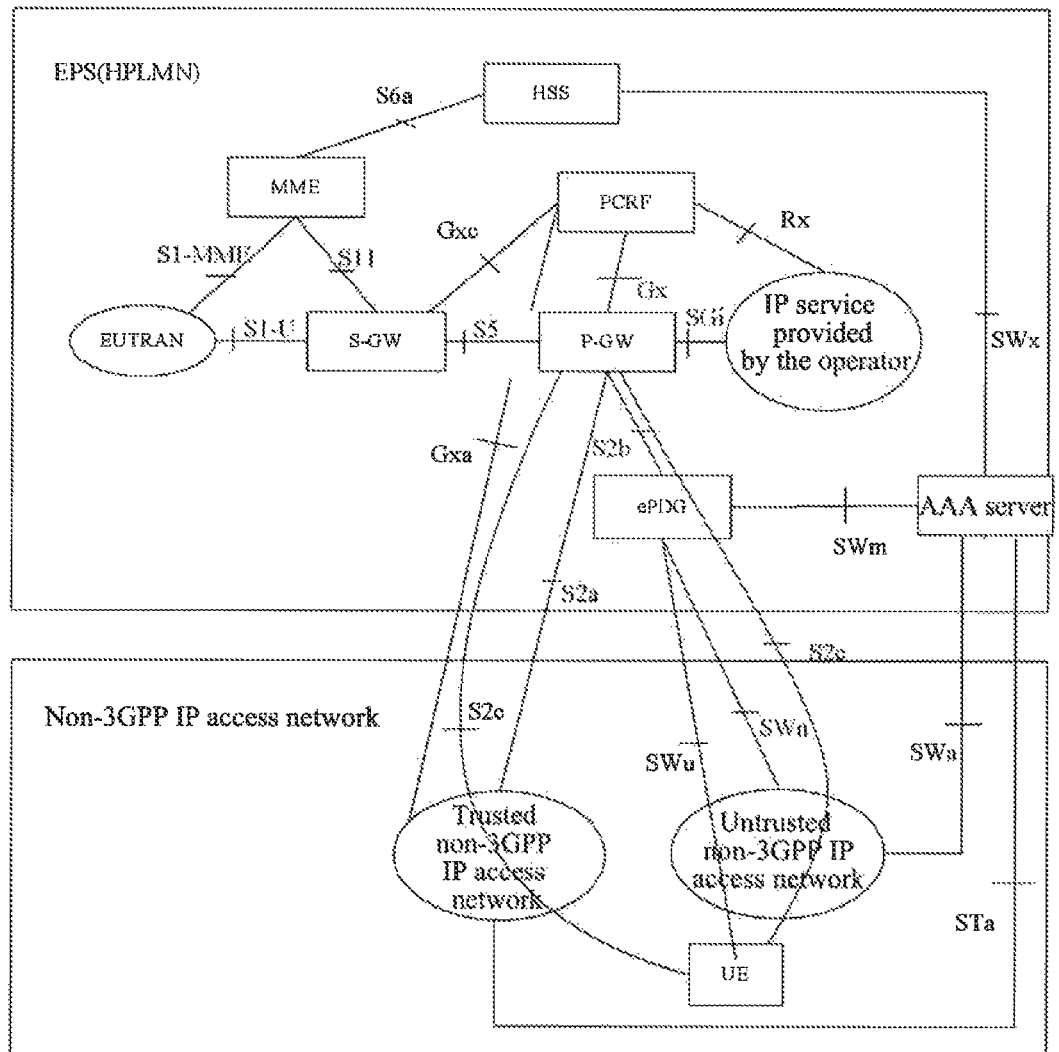
FIG. 1 is an EPS composition framework diagram in the related art.
Figure 2A:
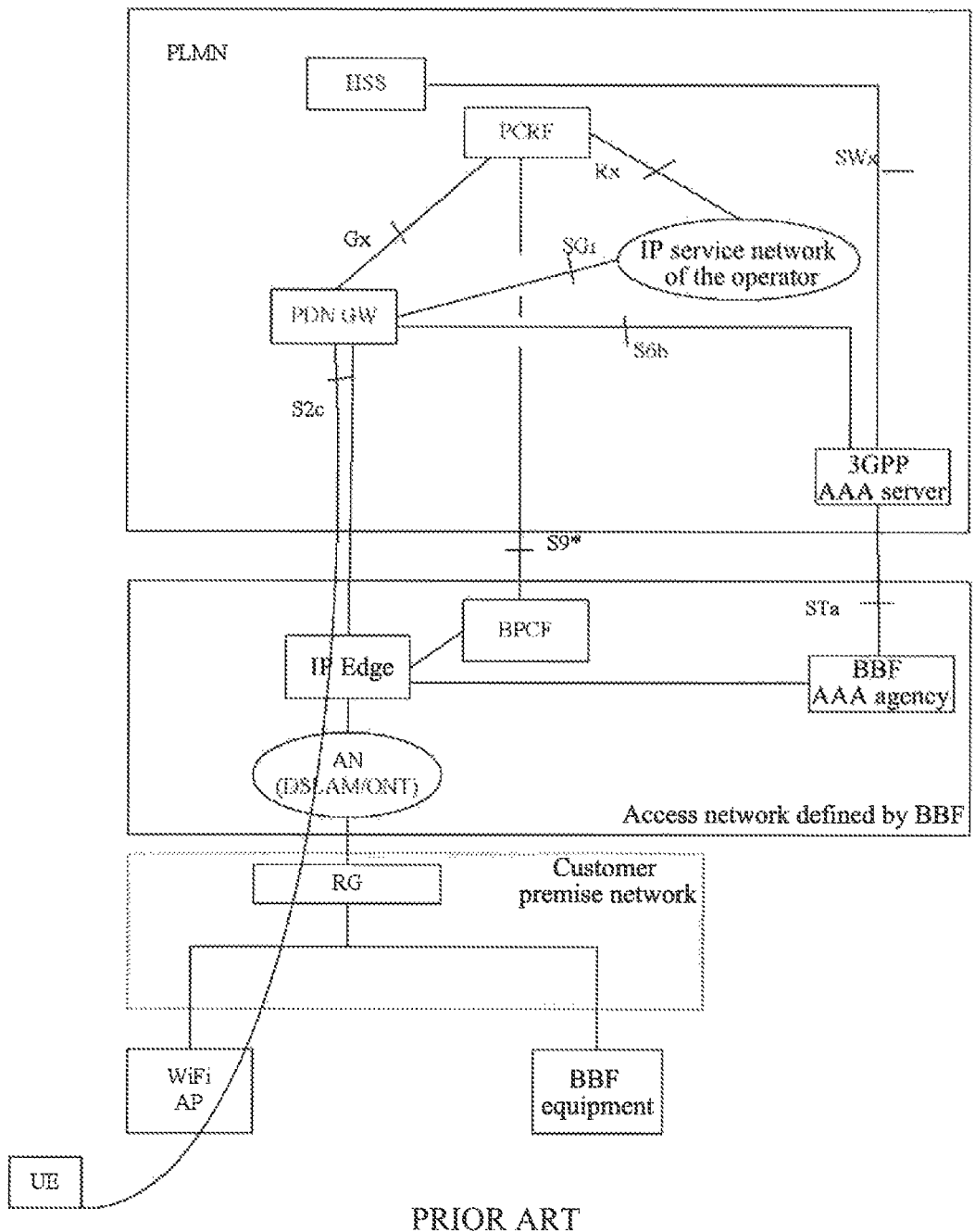
FIGS. 2a and 2b are framework diagrams of a UE accessing a 3GPP core network by adopting a DSMIPv6 through a fixed broadband access network in the related art.
Figure 2B:
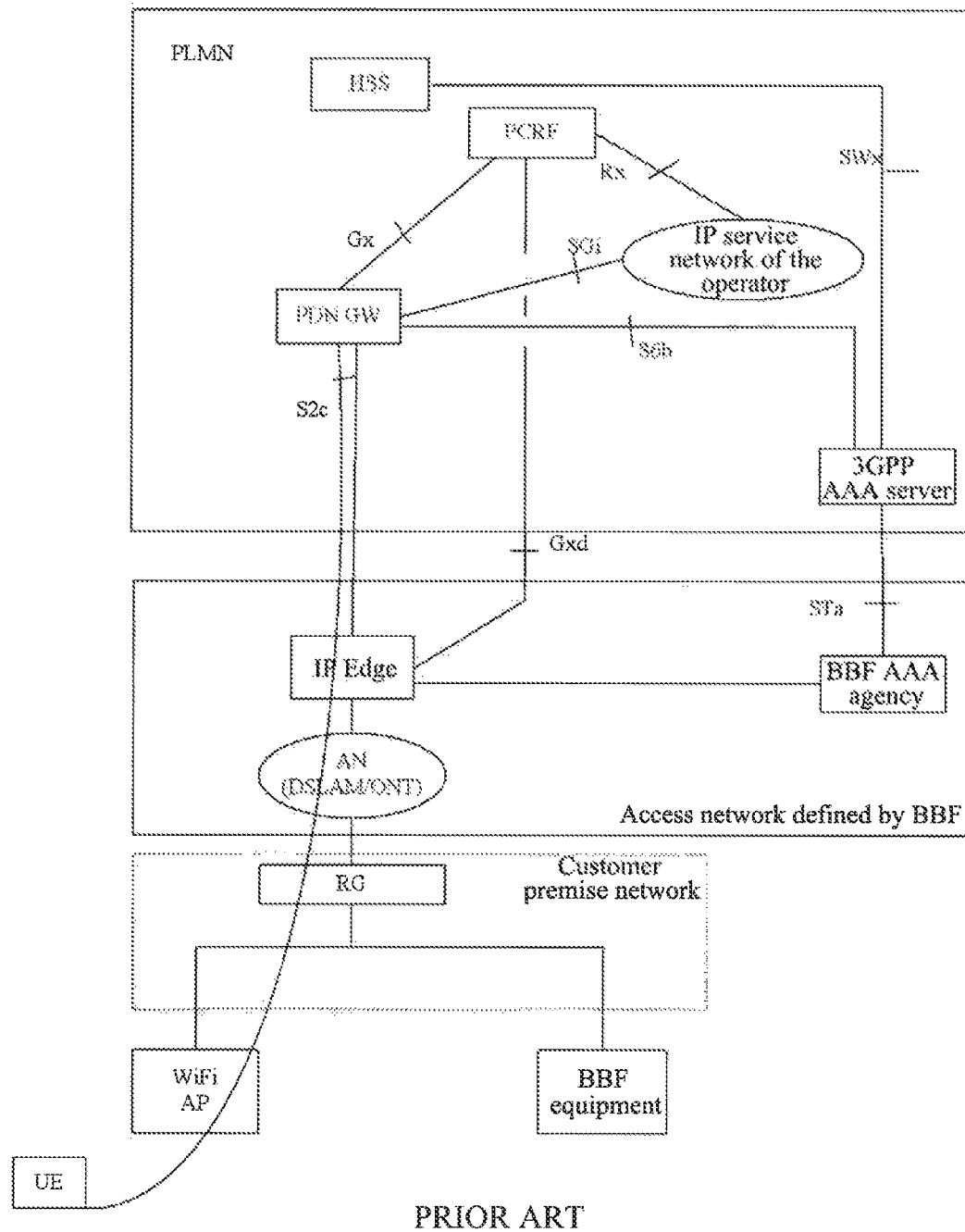
Figure 3:
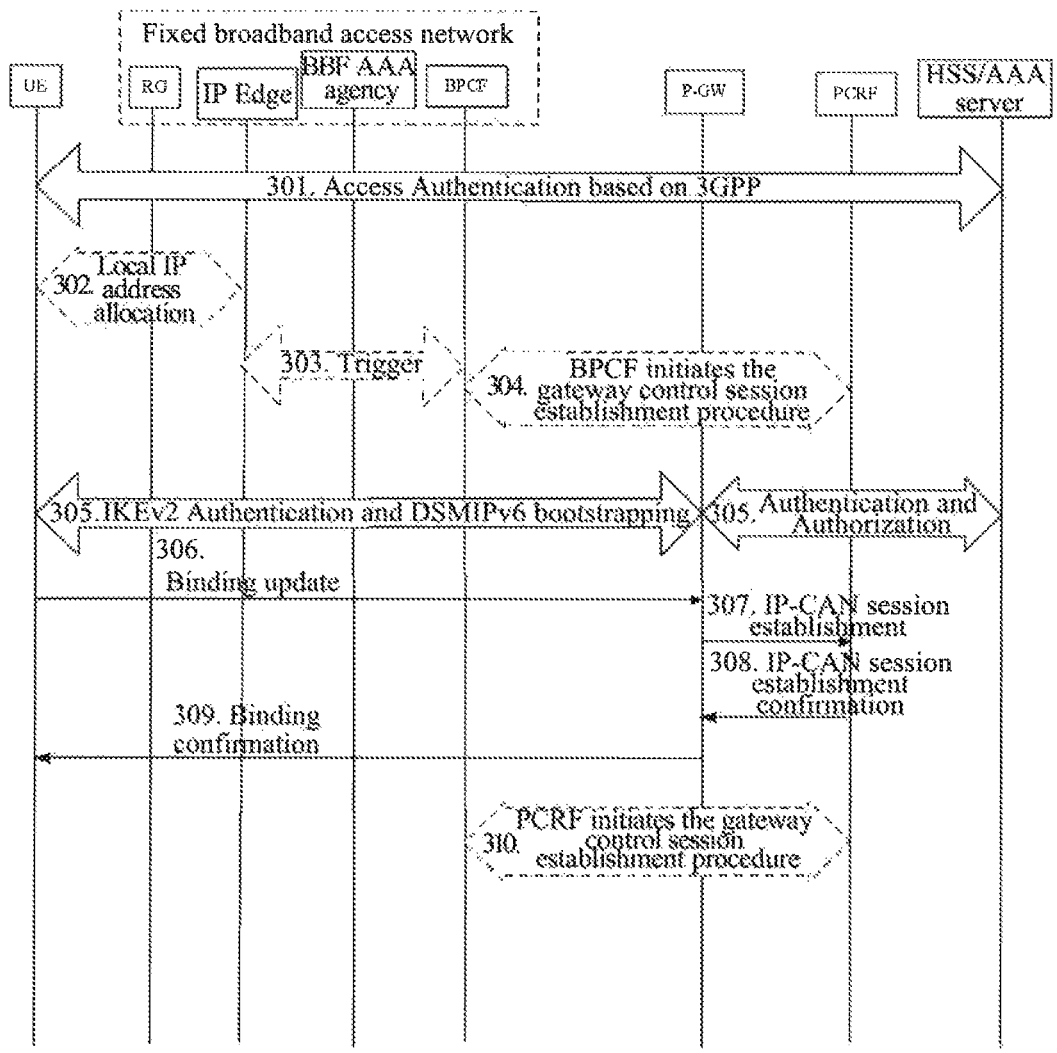
FIG. 3 is a flow chart of a UE accessing a 3GPP core network by adopting a DSMIPv6 through a fixed broadband access network in the related art.
Figure 4:
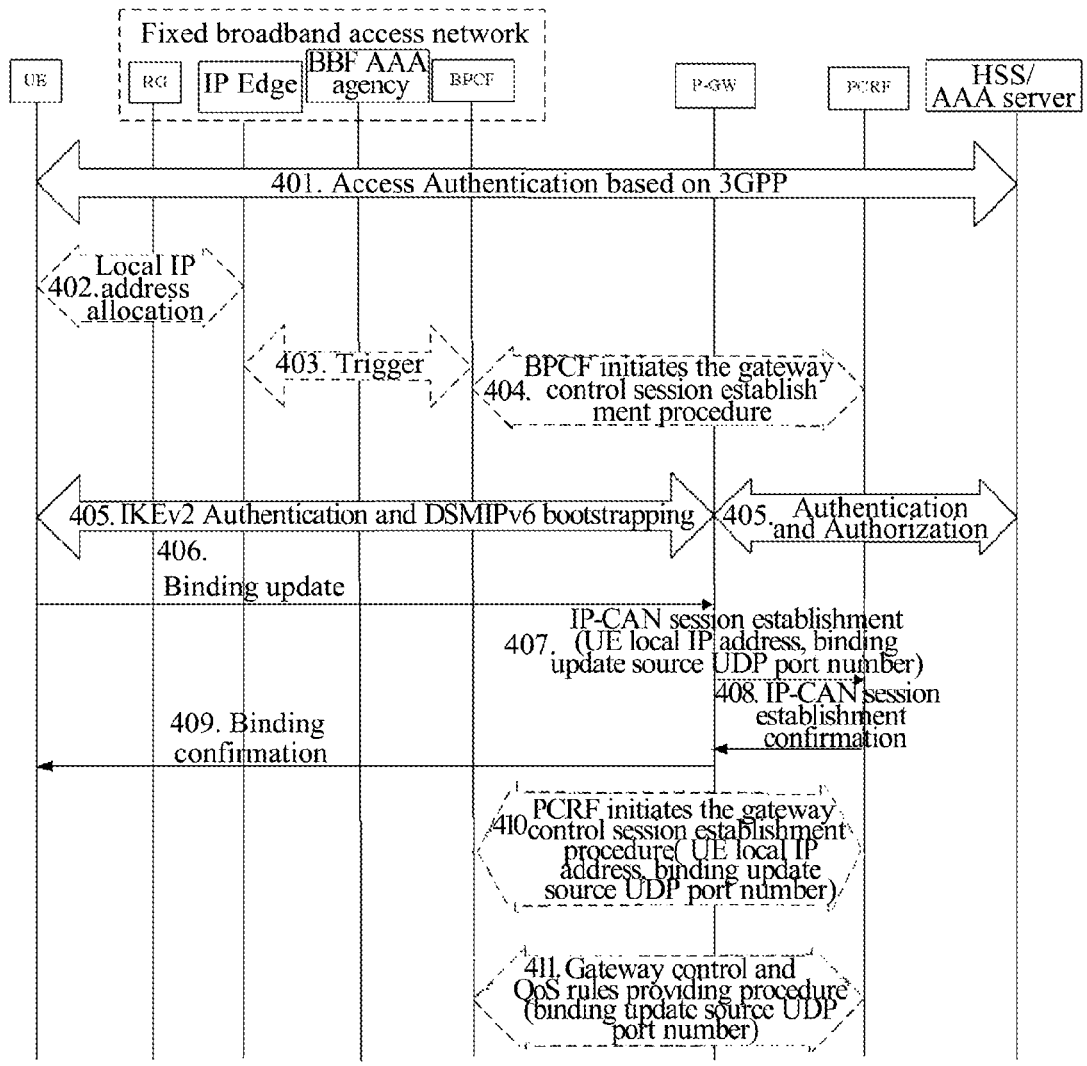
FIG. 4 is a flow chart of embodiment one of the present document.

FIG. 4 is an adherence procedure where the UE accesses the 3GPP core network by adopting the DSMIPv6 protocol through the fixed broadband access network under the scene of the policy intercommunication, wherein, the fixed broadband access network is a trusted non-3GPP access network, and there is an NAT between the UE and the P-GW, and usually the NAT lies in the RG. In this procedure, the PCRF provides the UDP port number for the BPCF, and the UDP port number is used for the UE data identification when the IPSec capsulation is not performed on the user plane data of the UE in the fixed broadband access network.

In step 401, the UE may carry out the access authentication procedure which is based on the 3GPP and participated by the fixed broadband access network;

in step 402, the UE obtains the local IP address from the fixed broadband access network as the care of address (CoA) of the UE, and the address is an IPv4 address;

in step 403, triggered by step 401 and step 402, the BPCF acquires that the UE is accessing the fixed broadband access network;

in step 404, after receiving the triggering, the BPCF initiates a gateway control session establishment procedure to the PCRF to establish the gateway control session, and the BPCF includes the user identification and the IP-CAN type into the message;

steps 401~404 are alternative steps and are performed when the UE performs the access authentication procedure which is based on the 3GPP and participated by the fixed broadband access network;

in step 405, the UE carries out the Bootstrapping procedure; the UE finds the P-GW, and in order to protect the DSMIPv6 message between the UE and the P-GW, the UE uses the IKEv2 to establishes the security association, and adopts the extendible identity authentication protocol (EAP) for authentication; the P-GW performs the communication with the Authentication, Authorization and Accounting server (AAA Server) (the AAA Server further interacts with the HSS) to finish the EAP authentication, and the P-GW distributes an IPv6 address prefix for the UE at the same time, and the UE constructs an IPv6 address as the home address (HoA) of the UE according to that prefix;

when the UE uses the IKEv2 to establish the security association with the P-GW, the source address for sending the IKEv2 signaling is the IP Address1 (that is, the local IP address obtained in step 402), and the source UDP port number is Port1 (usually, the value is 500). There is an NAT between the UE and the P-GW, so the source address and source UDP port number (that is the IPSec source UDP port number) of the IKEv2 signaling received by the P-GW are already changed. The source address of the IKEv2 information received by the P-GW is the IP Address2, and the source UDP port number is Port2. In order to describe easily, the source address of the UE obtained by the P-GW is also called the local IP address of the UE.

The format of the data package header for performing the IKEv2 signaling negotiation between the UE and the P-GW is as following:

| UE | P-GW |
|---|---|
| IPv4 (source_addr=Local IP address, dest_addr=P-GW IPv4 address)<br>UDP header (500, 500) HDR, SAi1, KEi, Ni<br>NAT-D, NAT-D --> | |
| | <-- IPv4 (source_addr= P-GW IPv4 address, dest_addr=Local IP Address)<br>UDP (500, Port x) HDR, SAr1, KEr, Nr, [CERTREQ]<br>NAT-D, NAT-D |
| IPv4 (source_addr=Local IP, dest_addr= P-GW IPv4 address)<br>UDP (4500, 4500) <non-ESP Marker > HDR, SK<br>{IDi, [CERT,] [CERTREQ,] [IDr,] AUTH, N(USE_TRANSPORT_MODE),<br>SAi2, TSi, TSr} --> | |
| | <--IPv4 (source_addr= P-GW IPv4 address, dest_addr= Local IP Address)<br>UDP (4500,Port2) <non-ESP Marker > HDR, SK<br>{IDr, [CERT,] AUTH, N(USE_TRANSPORT_MODE),<br>SAr2, TSi, TSr} | in step 406, the UE sends the DSMIPv6 binding update message to the P-GW, carrying the HoA and the CoA;

because there is an NAT between the UE and the P-GW, NAT traversing is also performed on the binding update message sent by the UE to the P-GW. The source address for the UE sending the binding update signaling is the IP Address1 (that is, the local IP address obtained in step 402), and the source UDP port number is Port3 (any appropriate port value). Because there is the NAT between the UE and the P-GW, the source address and the source UDP port number of the binding update signaling received by the P-GW (that is, the source UPD port number of the DSMIPv6 binding update signaling) are already changed. The source address of the binding update signaling received by the P-GW is the IP Address2, and the source UDP port number is Port4. In order to describe easily, the source address of the UE obtained by the P-GW is also called the local IP address of the UE.

The format of the data package header for performing the binding update signaling interaction between the UE and the P-GW is as following:

| UE | P-GW |
|---|---|
| IPv4 header (src=Local IP Address, dst=P-GW IPv4 address) <br> UDP header (sport3, dport=DSMIPv6) <br> IPv6 header (src=HoA, dst=P-GW IPv6 address) <br> ESP header in transport mode <br> Mobility header <br> BU [IPv4 HAO] --> | |
| | <--IPv4 header (src= P-GW IPv4 address, dst= Local IP Address) <br> UDP header (sport=DSMIPv6, dport=Port4) <br> IPv6 header (src= P-GW IPv6 address, dst=HoA) <br> ESP header in transport mode <br> Mobility header <br> BA ([IPv4 ACK], NAT DET) | in step 407, the P-GW sends IP-CAN session establishment indication message to the PCRF to establish a Gx session, and the message carries the user identification, the HoA, the UE local IP address (that is, CoA, i.e. the IP address2 in the present embodiment) and the source UPD port number of the DSMIPv6 binding update signaling (that is, Port4 in the present embodiment);

because the UE has not initiated a request for performing the IPSec capsulation on the user plane data at this moment, the source port number provided by the P-GW for the PCRF is the source UPD port number of the DSMIPv6 binding update signaling;

the P-GW can also provide tunnel header information in the related art for the PCRF (the tunnel header information contains the source UPD port number of the DSMIPv6 binding update signaling), and the PCRF obtains the source UPD port number of the DSMIPv6 binding update signaling;

in step 408, if steps 401~404 are carried out, the PCRF correlates the gateway control session established in step 404 and the Gx session established in step 407 according to the CoA or the user identification; the PCRF formulates the PCC rules and the QoS rules; and the PCRF returns confirmation message to the PCEF, carrying the PCC rules therein;

in step 409, the P-GW returns the binding confirmation message to the UE;

in step 410, if steps 401~404 are not performed, then the PCRF determines the entry point of the BPCF of the fixed broadband access network accessed by the UE at present according to the UE local IP address, and initiates the gateway control session establishment procedure initiated by the PCRF to establish the gateway control session, and the gateway control session establishment message carries the UE local IP address and the source UPD port number of the DSMIPv6 binding update signaling (that is, the port4 in the present embodiment). The BPCF may further provide the UE local IP address and the source UPD port number of the DSMIPv6 binding update signaling to the IP Edge;

in step 411, if steps 401~404 are carried out, then the PCRF initiates the gateway control and the QoS rule providing procedure, and provides the source UPD port number of the DSMIPv6 binding update signaling (that is, the Port4 in the present embodiment) for the BPCF through the gateway control session established in step 404. The BPCF may further provides the UE local IP address and the source UPD port number of the DSMIPv6 binding update signaling to the IP Edge. Through the above-mentioned procedure, the fixed broadband access network obtains the UE local IP address and the source UPD port number of the DSMIPv6 binding update signaling after the NAT is performed.

The format of the user plane data between the UE and the P-GW is as follows. The fixed broadband access network can identify the data of the UE according to the local IP address and the port number Port4, to perform a corresponding policy control.

| UE | P-GW |
|---|---|
| IPv4 header (src=Local IP Address, dst=P-GW IPv4 address) <br> UDP header (sport3, dport=DSMIPv6) <br> IPv6 header (src=HoA, dst= CN IP address) <br> Payload --> | |
| | <--IPv4 header (src= P-GW IPv4 address, dst= Local IP Address) <br> UDP header (sport=DSMIPv6, dport=Port4) <br> IPv6 header (src=CN IP Address, dst=HoA) <br> Payload |

In other embodiments, the P-GW provides the IPSec source UDP port number and the source UPD port number of the DSMIPv6 binding update signaling for the PCRF at the same time (the source UPD port number of the DSMIPv6 binding update signaling can be included in the tunnel header information in the related art at this moment); when the PCRF receives the source UPD port number of the DSMIPv6 binding update signaling (that is, when receiving the tunnel header information), it is analyzed that the IPSec capsulation is not performed on the user plane data according to the tunnel header information, so the PCRF provides the source UPD port number of the DSMIPv6 binding update signaling for the BPCF (that is, when receiving the tunnel header information). Certainly, the P-GW can explicitly notify the PCRF that the IPSec capsulation is not performed on the user plane data, so that the PCRF provides the source UPD port number of the DSMIPv6 binding update signaling for the BPCF. The BPCF may further provide the source UPD port number of the DSMIPv6 binding update signaling for the IP Edge.

Under the scene of the policy convergence, the adherence procedure where the UE accesses the 3GPP core network by adopting the DSMIPv6 protocol through the fixed broadband access network is similar to the above. The difference lies in that the IP Edge performs the interaction with the PCRF directly, the PCRF provides the UDP port number for the IP Edge directly, and the UDP port number is used for the UE data identification when the IPSec capsulation is not performed on the user plane data of the UE in the fixed broadband access network.

Through the above-mentioned procedure, the fixed broadband access network (such as the IP Edge) can perform the identification and policy control on the user plane data according to the source UDP port number of the DSMIPv6 binding update signaling obtained. The user plane data on which the IPSec capsulation is not performed can be identified at this moment.

Figure 5:
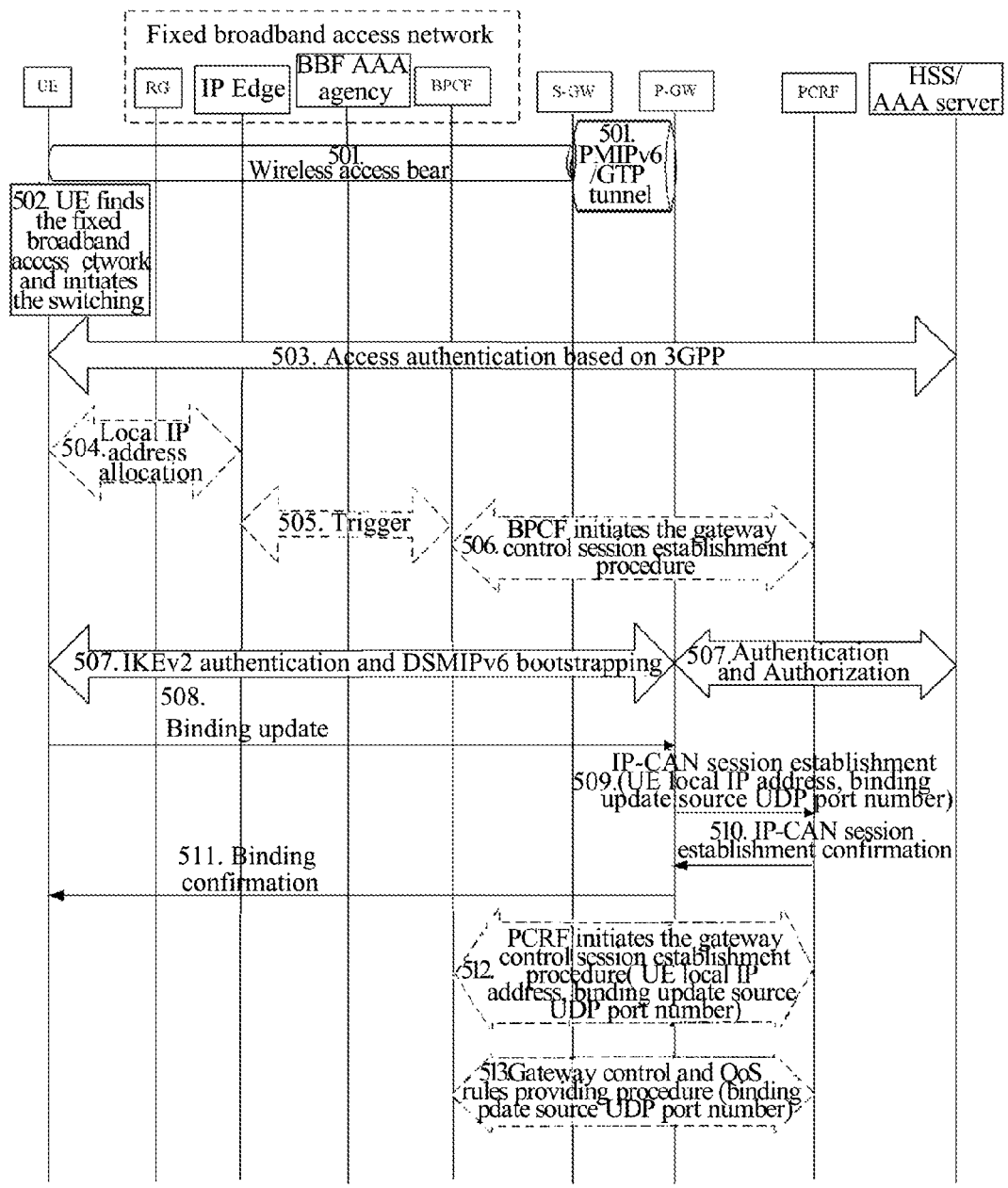
FIG. 5 is a flow chart of embodiment two of the present document.

FIG. 5 is the switching procedure where the UE switches from the 3GPP access to accessing the 3GPP core network by adopting the DSMIPv6 protocol through the fixed broadband access network under the scene of the policy intercommunication, wherein, the fixed broadband access network is regarded as the trusted non-3GPP access network, and there is the NAT between the UE and the P-GW, and usually this NAT lies in the RG. In the procedure, the PCRF provides the UDP port number for the BPCF, and the UDP port number is used for the UE data identification when the IPSec capsulation is not performed on the user plane data of the UE in the fixed broadband access network.

In step 505: triggered by step 503 and step 504, the BPCF acquires that the UE is accessing the fixed broadband access network;

in step 506, after receiving the trigger, the BPCF sends a gateway control session establishment procedure to the PCRF to establish the gateway control session, and the BPCF includes the user identification and the IP-CAN type in the message;

steps 503~506 are optional steps and are performed when the UE performs the access authentication procedure which is based on the 3GPP and participated by the fixed broadband access network;

in step 507, the UE carries out the Bootstrapping procedure; the UE finds the P-GW selected during the 3GPP access, and in order to protect the DSMIPv6 message between the UE and the P-GW, the UE uses the IKEv2 to establishes the security association, and adopts the extendible identity authentication protocol (EAP) for authentication; the P-GW performs the communication with the Authentication, Authorization and Accounting server (AAA Server) (the AAA Server further interacts with the HSS) to finish the EAP authentication; the UE notifies the P-GW to perform the switching, and the P-GW allocates a prefix for the UE, which is same with the one before the switching;

when the UE uses the IKEv2 to establish the security association with the P-GW, the source address for the UE sending the IKEv2 signaling is the IP Address1 (that is, the local IP address obtained in step 504), and the source UDP port number is Port1 (usually, the value is 500). There is an NAT between the UE and the P-GW, so the source address and source UDP port number of the IKEv2 signaling (that is the IPSec source UDP port number) received by the P-GW are already changed. The source address of the IKEv2 signaling received by the P-GW is IP Address2, and the source UDP port number is Port2. In order to describe easily, the source address of the UE obtained by the P-GW is also called the local IP address of the UE.

The format of the data package header for performing the binding update signaling interaction between the UE and the P-GW is as following:

| UE | P-GW |
|---|---|
| IPv4 (source_addr=Local IP address, dest_addr=P-GW IPv4 address) UDP header (500, 500) HDR, SAi1, KEi, Ni NAT-D, NAT-D --> | |
| | <-- IPv4 (source_addr= P-GW IPv4 address, dest_addr=Local IP Address) UDP (500, Port x) HDR, SAr1, KEr, Nr, [CERTREQ] NAT-D, NAT-D |
| IPv4 (source_addr=Local IP, dest_addr= P-GW IPv4 address) UDP (4500, 4500) <non-ESP Marker > HDR, SK {IDi, [CERT,] [CERTREQ,] [IDr,] AUTH, N(USE_TRANSPORT_MODE), SAi2, TSi, TSr} --> | |
| | <--IPv4 (source_addr= P-GW IPv4 address, dest_addr= Local IP Address) UDP (4500,Port2) <non-ESP Marker > HDR, SK {IDr, [CERT,] AUTH, N(USE_TRANSPORT_MODE), SAr2, TSi, TSr} |

In step 501, the UE establishes the PDN connection through the 3GPP access, and the UE obtains the IP address to perform the service visit;

in step 502, the UE finds the fixed broadband access network and determines to initiate the switching;

in step 503, the UE may carry out the access authentication procedure which is based on the 3GPP and participated by the fixed broadband access network;

in step 504, the UE obtains the local IP address from the fixed broadband access network as the care of address (CoA) of the UE, and the address is an IPv4 address;

in step 508, the UE sends the DSMIPv6 binding update message to the P-GW, carrying the HoA (that is, the IP address in step 501) and the CoA;

because there is an NAT between the UE and the P-GW, NAT traversing is also performed on the binding update message sent by the UE to the P-GW. The source address for the UE sending the binding update signaling is the IP Address1 (that is, the local IP address obtained in step 504), and the source UDP port number is Port3 (any appropriate port value). Because there is the NAT between the UE and the P-GW, the source address and the source UDP port number of the binding update signaling received by the P-GW (that is, the source UPD port number of the DSMIPv6 binding update signaling) are already changed. The source address of the binding update signaling received by the P-GW is IP Address2, and the source UDP port number is Port4. In order to describe easily, the source address of the UE obtained by the P-GW is also called the local IP address of the UE.

The format of the data package header for performing the binding update signaling interaction between the UE and the P-GW is as following:

| UE | P-GW |
|---|---|
| IPv4 header (src=Local IP Address, dst=P-GW IPv4 address) | |
| UDP header (sport3, dport=DSMIPv6) | |
| IPv6 header (src=HoA, dst= P-GW IPv6 address) | |
| ESP header in transport mode | |
| Mobility header | |
| BU [IPv4 HAO] --> | |
| | <--IPv4 header (src= P-GW IPv4 address, dst= Local IP Address) |
| | UDP header (sport=DSMIPv6, dport=Port4) |
| | IPv6 header (src= P-GW IPv6 address, dst=HoA) |
| | ESP header in transport mode |
| | Mobility header |
| | BA ([IPv4 ACK], NAT DET) | in step 509, the P-GW sends an IP-CAN session establishment indication message to the PCRF to establish a Gx session, and the message carries the user identification, the HoA, the UE local IP address (that is, CoA, and also is the IP address2 in the present embodiment) and the source UPD port number of the DSMIPv6 binding update signaling (that is, Port4 in the present embodiment);

because the UE has not initiated a request for performing the IPSec capsulation on the user plane data at this moment, the source port number provided by the P-GW for the PCRF is the source UPD port number of the DSMIPv6 binding update signaling.

In other methods, the P-GW can also provide tunnel header information in the related art for the PCRF (this tunnel header information includes the source UPD port number of the DSMIPv6 binding update signaling), and the PCRF obtains the source UPD port number of the DSMIPv6 binding update signaling therefrom.

In step 510, if steps 503~506 are carried out, the PCRF correlates the gateway control session established in step 506 with the Gx session established in step 509 according to the CoA or the user identification; the PCRF formulates the PCC rules and the QoS rules; and the PCRF returns confirmation message to the PCEF, carrying the PCC rules therein;

in step 511, the P-GW returns the binding confirmation message to the UE;

in step 512, if steps 503~506 are not performed, then the PCRF determines the entry point of the BPCF of the fixed broadband access network accessed by the UE at present according to the UE local IP address, and initiates the gateway control session establishment procedure initiated by the PCRF to establish the gateway control session, and the gateway control session establishment message carries the UE local IP address and the source UPD port number of the DSMIPv6 binding update signaling (that is, the port4 in the present embodiment). The BPCF may further provide the UE local IP address and the source UPD port number of the DSMIPv6 binding update signaling for the IP Edge;

in step 513, if steps 503~506 are carried out, then the PCRF initiates the gateway control and the QoS rule providing procedure, and provides the source UPD port number of the DSMIPv6 binding update signaling (that is, the Port4 in the present embodiment) for the BPCF through the gateway control session established in step 506. The BPCF may further provides the UE local IP address and the source UPD port number of the DSMIPv6 binding update signaling for the IP Edge.

Through the above-mentioned procedure, the fixed broadband access network obtains the UE local IP address and the source UPD port number of the DSMIPv6 binding update signaling after the NAT is performed.

The format of the user plane data between the UE and the P-GW is as follows. The fixed broadband access network can identify the data of the UE according to the local IP address and the port number Port4, to perform the corresponding policy control.

| UE | P-GW |
|---|---|
| IPv4 header (src=Local IP Address, dst=P-GW IPv4 address) | |
| UDP header (sport3, dport=DSMIPv6) | |
| IPv6 header (src=HoA, dst= CN IP address) | |
| Payload --> | |
| | <--IPv4 header (src= P-GW IPv4 address, dst= Local IP Address) |
| | UDP header (sport=DSMIPv6, dport=Port4) |
| | IPv6 header (src=CN IP Address, dst=HoA) |
| | Payload |

In other embodiment, the P-GW provides the IPSec source UDP port number and the source UPD port number of the DSMIPv6 binding update signaling for the PCRF at the same time (the source UPD port number of the DSMIPv6 binding update signaling can be included in the tunnel header information in the related art at this moment); when the PCRF receives the source UPD port number of the DSMIPv6 binding update signaling (that is, when receiving the tunnel header information), the PCRF analyzes that the IPSec capsulation is not performed on the user plane data according to the tunnel header information, so the PCRF provides the source UPD port number of the DSMIPv6 binding update signaling for the BPCF (that is, when receiving the tunnel header information). Certainly, the P-GW can explicitly notify the PCRF that the IPSec capsulation is not performed on the user plane data, so that the PCRF provides the source UPD port number of the DSMIPv6 binding update signaling for the BPCF.

Under the scene of the policy convergence, the switching procedure of the UE switching from the 3GPP access to accessing the 3GPP core network by adopting the DSMIPv6 protocol through the fixed broadband access network is similar to the above. The difference lies in that the IP Edge performs the interaction with the PCRF directly, the PCRF provides the UDP port number for the IP Edge directly, and the UDP port number is used for the UE data identification when the IPSec capsulation is not performed on the user plane data of the UE in the fixed broadband access network.

in step 605, the PCRF initiates the gateway control and the QoS rule providing procedure, and provides the IPSec source UDP port number for the BPCF.

The BPCF replaces the source UPD port number of the DSMIPv6 binding update signaling provided before with the received IPSec source UDP port number, or adds the received IPSec source UDP port number.

Through the above-mentioned procedure, the fixed broadband access network obtains the UE local IP address and the IPSec source UDP port number after the NAT is performed.

The format of the user plane data between the UE and the P-GW is as follows. The fixed broadband access network can identify the data of the UE according to the local IP address and the port number Port2, to perform a corresponding policy control.

| UE | P-GW |
|---|---|
| IPv4 header (src=Local IP Address, dst=P-GW IPv4 address)<br>UDP header (sport1, dport=DSMIPv6)<br>ESP<br>IPv6 header (src=HoA, dst= CN IP address)<br>Payload --> | |
| | <--IPv4 header (src= P-GW IPv4 address, dst= Local IP Address)<br>UDP header (sport=DSMIPv6, dport=Port2)<br>ESP<br>IPv6 header (src=CN IP Address, dst=HoA)<br>Payload |

Through the above-mentioned procedure, the fixed broadband access network (such as the IP Edge) can perform the identification and policy control on the user plane data according to the source UDP port number of the DSMIPv6 binding update signaling obtained. The user plane data on which the IPSec capsulation is not performed can be identified at this moment.

Figure 6:
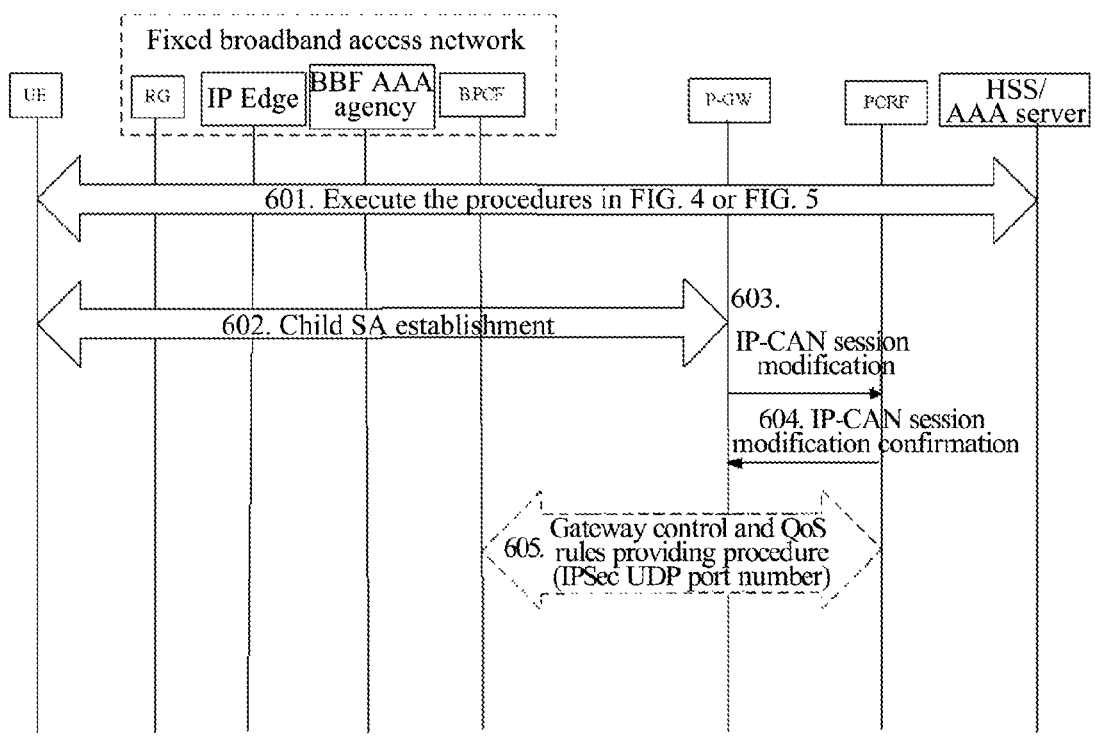
FIG. 6 is a flow chart of embodiment three of the present document.

FIG. 6 is the procedure that the UE or the P-GW determines to perform the IPSec capsulation (integrity protection and/or confidentiality protection) on the user plane data and the PCRF provides the new port number for the BPCF under the scene of the policy intercommunication.

In step 601, the procedure in FIG. 4 or FIG. 5 is executed, and the UE accesses the 3GPP core network through the fixed broadband access network;

in step 602, the UE or the P-GW determines to trigger the procedure of establishing the Child IPSec security association, so as to protect the user plane data;

the Child IPSec SA can be used for the integrity protection and/or confidentiality protection of the user plane data.

In other embodiment, the P-GW provides the new tunnel header information or explicitly notifies the PCRF that IPSec capsulation is performed on the user plane data at the same time. The PCRF analyzes that IPSec capsulation is performed on the user plane data according to the tunnel header information, so the PCRF provides the IPSec source UDP port number for the BPCF.

Under the scene of the policy convergence, when the UE or the P-GW determines to perform the IPSec capsulation (integrity protection and/or confidentiality protection) on the user plane data, the PCRF provides the IPSec source UDP port number for the IP Edge directly.

Through the above-mentioned procedure, the fixed broadband access network (such as the IP Edge) can perform the identification and policy control on the user plane data according to the obtained IPSec source UDP port number. The user plane data on which the IPSec capsulation is performed can be identified at this moment.

Figure 7:
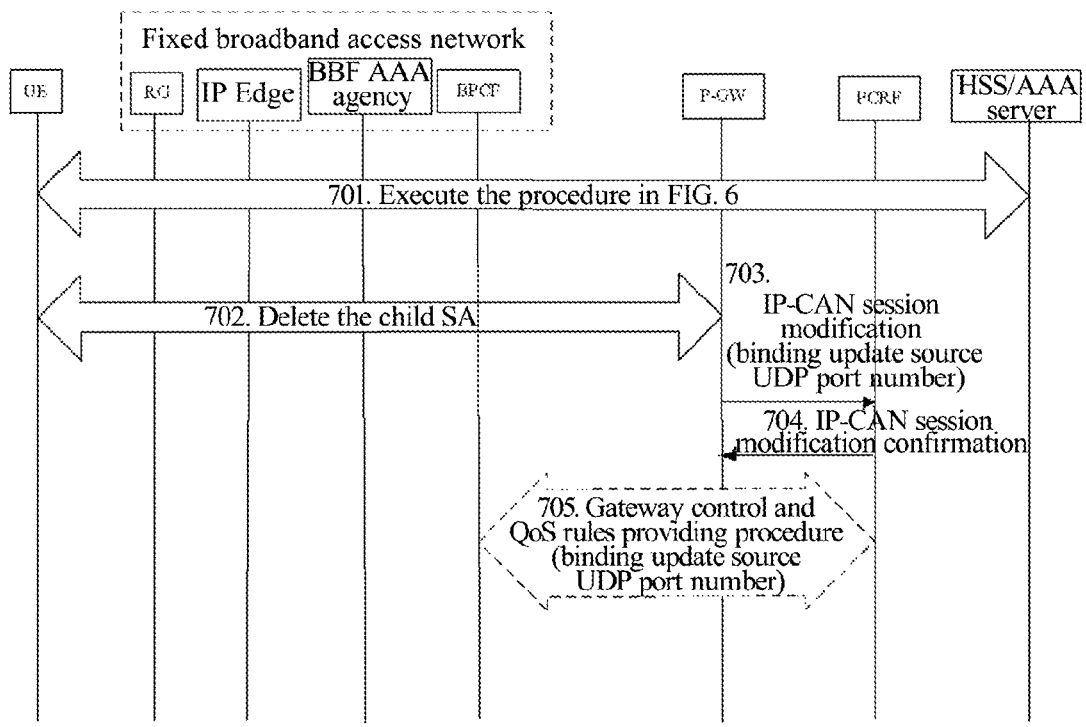
FIG. 7 is a flow chart of embodiment four of the present document.

FIG. 7 is the procedure that the PCRF provides the new port number for the BPCF after the UE or the P-GW determines to perform the IPSec capsulation (integrity protection and/or confidentiality protection) on the user plane data and deter-

| UE | P-GW |
|---|---|
| IPv4 (source_addr=Local IP Address, dest_addr=P-GW IPv4 address)<br>UDP (4500,4500) < non-ESP Marker > HDR, SK<br>{[N], SA, Ni, [KEi], TSi, TSr} --> | |
| | <--IPv4 (source_addr=P-GW IPv4 address, dest_addr=Local IP address)<br>UDP (4500, port 2) < non-ESP Marker > HDR, SK<br>SA, Nr, [KEr], TSi, TSr} |

In step 603, the P-GW sends the IP-CAN session modification indication message to the PCRF, and the message carries the IPSec source UDP port number (that is, the Port 2);

in step 604, the PCRF returns the confirmation message to the PCEF;

mines to deletes the security association again under the scene of the policy intercommunication.

In step 701, the procedure in FIG. 6 is executed, and the Child SA is established between the UE and the P-GW;

in step 702, the UE or the P-GW determines to trigger the procedure of deleting the Child IPSec security association;

in step 703, the P-GW sends the IP-CAN session modification indication message to the PCRF, and the message carries the source UPD port number of the DSMIPv6 binding update signaling (that is, Port 4);

in step 704, the PCRF returns the confirmation message to the PCEF;

in step 705, the PCRF initiates the gateway control and the QoS rule providing procedure, and provides the source UPD port number of the DSMIPv6 binding update signaling for the BPCF, to replace the IPSec source UDP port number provided before. The BPCF may further provide the source UPD port number of the DSMIPv6 binding update signaling for the IP Edge, to replace the IPSec source UDP port number provided before.

Through the above-mentioned procedure, the fixed broadband access network obtains the UE local IP address and the source UPD port number of the DSMIPv6 binding update signaling after the NAT is performed.

The format of the user plane data between the UE and the P-GW is as follows. The fixed broadband access network can identify the data of the UE according to the local IP address and the port number Port4, to perform a corresponding policy control.

| UE | P-GW |
|---|---|
| IPv4 header (src=Local IP Address, dst=P-GW IPv4 address) | |
| UDP header (sport3, dport=DSMIPv6) | |
| IPv6 header (src=HoA, dst= CN IP address) | |
| Payload --> | |
| | <--IPv4 header (src= P-GW IPv4 address, dst= Local IP Address) |
| | UDP header (sport=DSMIPv6, dport=Port4) |
| | IPv6 header (src=CN IP Address, dst=HoA) |
| | Payload |

In other embodiment, the P-GW provides the new tunnel header information or explicitly notifies the PCRF that the IPSec capsulation is not performed on the user plane data at the same time. The PCRF analyzes that the IPSec capsulation is not performed on the user plane data according to the tunnel header information, so the PCRF provides the source UPD port number of the DSMIPv6 binding update signaling for the BPCF. The BPCF may further provide the source UPD port number of the DSMIPv6 binding update signaling for the IP Edge.

Under the scene of the policy convergence, the PCRF provides the source UPD port number of the DSMIPv6 binding update signaling for the IP Edge directly, to replace the IPSec source UDP port number provided before.

Through the above-mentioned procedure, the fixed broadband access network (such as the IP Edge) can perform the identification and policy control on the user plane data according to the source UDP port number of the DSMIPv6 binding update signaling obtained. The user plane data on which the IPSec capsulation is not performed can be identified at this moment.

In order to make the fixed broadband access network identify the data of the UE on which the IPSec capsulation is or is not performed, which can also be realized through other methods, that is, in the procedures of FIG. 4 or FIG. 5, the P-GW also reports the IPSec source UDP port number when reporting the source UPD port number of the DSMIPv6 binding update signaling to the PCRF. And the PCRF also provides the IPSec source UDP port number when providing the source UPD port number of the DSMIPv6 binding update signaling for the BPCF. Or in the procedures of FIG. 4 or FIG. 5, the P-GW reports the IPSec source UDP port number when reporting the source UPD port number of the DSMIPv6 binding update signaling for the PCRF, and the PCRF only provides the source UPD port number of the DSMIPv6 binding update signaling for the BPCF, while in the procedures of FIG. 6, the PCRF then provides the IPSec source UDP port number to the BPCF. Through the above-mentioned scheme, after the UE or the P-GW requests for performing the IPSec capsulation on the user plane data, the fixed broadband access network (such as the IP Edge) can perform the identification and policy control on the user plane data on which the IPSec capsulation is or is not performed respectively according to the obtained IPSec source UDP port number and the source UPD port number of the DSMIPv6 binding update signaling. Likewise, for the scene of the policy convergence, the PCRF only needs to interact with the IP Edge directly, and provides the corresponding UDP port number. The method is applicable for the situation that the IPSec capsulation is performed on all user plane data or only on some of the user plane data.

Figure 8:
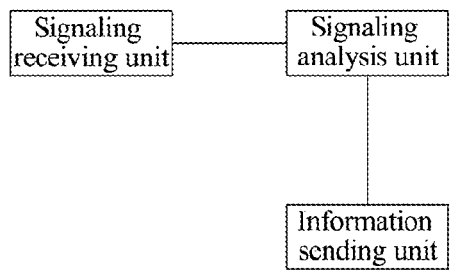
FIG. 8 is a framework diagram of a packet data network gateway according to an embodiment of the present document.

As shown in FIG. 8, the present embodiment further provides a packet data network gateway, including a signaling receiving unit, a signaling analysis unit and an information sending unit, wherein:

the signaling receiving unit is configured to receive a Mobile IPv6 support for Dual Stack Hosts and Routers (DSMIPv6) binding update signaling from a UE, and the signaling carries the HoA and the CoA;

the signaling analysis unit is configured to analyze the DSMIPv6 binding update signaling, to obtain the source UDP port number of the DSMIPv6 binding update signaling; and the information sending unit is configured to notify the source UDP port number of the DSMIPv6 binding update signaling to the PCRF, and notify the IPSec source UDP port number to the PCRF when notifying the source UDP port number of the DSMIPv6 binding update signaling to the PCRF;

or the information sending unit is further configured to notify the IPSec source UDP port number to the PCRF after a user equipment or the packet data network gateway triggers to establish a child IPSec security association, and send the tunnel header information to the PCRF or notify the PCRF that the IPSec capsulation is performed on the user plane data of the user equipment; and notify the source UDP port number of the DSMIPv6 binding update signaling to the PCRF after the user equipment or the packet data network gateway deletes the Child IPSec security association.

The information sending unit sends the tunnel header information to the PCRF, and includes the source UPD port number of the DSMIPv6 binding update signaling in the tunnel header information, so as to send the source UPD port number of the DSMIPv6 binding update signaling to the PCRF.

Figure 9:
FIG. 9 is a framework diagram of a policy and charging rules function according to an embodiment of the present document.

As shown in FIG. 9, the present embodiment further provides a policy and charging rules function, including an information receiving unit and an information distribution unit, wherein, the information receiving unit is configured to receive a source User Datagram Protocol (UDP) port number of a DSMIPv6 binding update signaling from a packet data network gateway (P-GW); and receive the IPSec source UDP port number when receiving the source UDP port number of the DSMIPv6 binding update signaling; the information receiving unit obtains the source UDP port number of the DSMIPv6 binding update signaling from the tunnel header information sent by the PCRF;

the information distribution unit is configured to notify the source UDP port number of the DSMIPv6 binding update signaling to a fixed broadband access network, and notify the IPSec source UDP port number to the fixed broadband access network when notifying the source UDP port number of the DSMIPv6 binding update signaling to the fixed broadband access network;

the information distribution unit notifies the IPSec source UDP port number to the fixed broadband access network after analyzing and acquiring that the IPSec capsulation is performed on the user plane data of the user equipment according to the tunnel header information; or notifies the IPSec source UDP port number to the fixed broadband access network according to that the IPSec capsulation is performed on the user plane data of the user equipment, which is notified by the P-GW;

when the gateway control session is not established yet, the information distribution unit sends message of establishing the gateway control session to the fixed broadband access network, wherein, the message carries the source UDP port number of the DSMIPv6 binding update signaling; and when the gateway control session is established, the information distribution unit notifies the source UDP port number of the DSMIPv6 binding update signaling to the fixed broadband access network through the gateway control session;

when the gateway control session is not established yet, the information distribution unit sends message of establishing the gateway control session to the fixed broadband access network, wherein, the message carries the source UDP port number of the DSMIPv6 binding update signaling and the IPSec source UDP port number; and when the gateway control session is established, the information distribution unit notifies the source UDP port number of the DSMIPv6 binding update signaling and the IPSec source UDP port number to the fixed broadband access network through the gateway control session.

Figure 10:
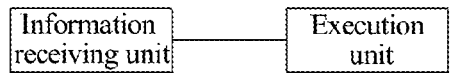
FIG. 10 is a framework diagram of an IP Edge according to an embodiment of the present document.

As shown in FIG. 10, the embodiment of the present document further provides an IP Edge, used as a network element of a fixed broadband network access network, including: an information receiving unit and an execution unit, wherein:

the information receiving unit is configured to receive a source User Datagram Protocol (UDP) port number of a Mobile IPv6 support for dual stack Hosts and Routers (DSMIPv6) binding update signaling from a policy and charging rules function (PCRF); and the execution unit is configured to perform identification and policy control on user plane data according to the source UDP port number of the DSMIPv6 binding update signaling obtained.

The information receiving unit is further configured to receive an internet protocol security (IPSec) source UDP port number when receiving the source UDP port number of the DSMIPv6 binding update signaling; and the execution unit is further configured to perform identification and policy control on the user plane data according to the IPSec source UDP port number obtained.

The information receiving unit is configured to obtain the source UDP port number of the DSMIPv6 binding update signaling or the IPSec source UDP port number from the PCRF directly or obtain through a broadband policy control framework (BPCF).

The above description is only the preferred embodiments of the present document and is not intended to limit the protection scope of the present document. All of the modifications, equivalents and/or variations without departing from the spirit and essence of the present document should be embodied in the scope of the appended claims of the present document.

INDUSTRIAL APPLICABILITY

Compared with the related art, the embodiments of the present document provide the UDP port number for the fixed broadband access network according to whether IPSec capsulation is performed on the user plane data, to make the fixed broadband access network be able to identify the user plane data of the user equipment correctly, and perform a corresponding policy control.

What we claim is:

1. An information transmission method, comprising: after receiving a Mobile IPv6 support for Dual Stack Hosts and Routers (DSMIPv6) binding update signaling, a packet data network gateway (P-GW) notifying a source User Datagram Protocol (UDP) port number of the DSMIPv6 binding update signaling to a Policy and Charging Rules Function (PCRF); and the PCRF notifying the source UDP port number of the DSMIPv6 binding update signaling to a fixed broadband access network;

further comprising:
the P-GW notifying the IPSec source UDP port number to the PCRF after the P-GW itself triggers to establish a Child IPSec security association; and the PCRF notifying the IPSec source UDP port number to the fixed broadband access network.

2. The method according to claim 1, wherein,
in the step of notifying a source UDP port number of the DSMIPv6 binding update signaling to a PCRF, the P-GW further notifies an Internet protocol security (IPSec) source UDP port number to the PCRF; and
in the step of notifying the source UDP port number of the DSMIPv6 binding update signaling to a fixed broadband access network, the PCRF further notifies the IPSec source UDP port number to the fixed broadband access network.

3. The method according to claim 1, further comprising:
after the fixed broadband access network receives the IPSec source UDP port number, adopting the IPSec source UDP port number to replace the source UDP port number of the DSMIPv6 binding update signaling, or adding the IPSec source UDP port number.

4. The method according to claim 1, wherein, the step of a P-GW notifying a source UDP port number of the DSMIPv6 binding update signaling to a PCRF comprises: the P-GW sending tunnel header information to the PCRF, comprising the source UPD port number of the DSMIPv6 binding update signaling; and
the step of the PCRF notifying the source UDP port number of the DSMIPv6 binding update signaling to a fixed broadband access network comprises: the PCRF obtaining the source UDP port number of the DSMIPv6 binding update signaling and notifying the source UDP port number of the DSMIPv6 binding update signaling to the fixed broadband access network.

5. The method according to claim 1, further comprising:
the P-GW sending the tunnel header information or user plane data of the user equipment to the PCRF, to notify the PCRF to perform IPSec capsulation; and
the step of the PCRF notifying the IPSec source UDP port number to the fixed broadband access network comprising: after the PCRF analyzes according to the tunnel header information and acquires that the IPSec capsulation is performed on the user plane data of the user equipment, notifying the IPSec source UDP port number to the fixed broadband access network; or performing the IPSec capsulation according to the user plane data of the user equipment sent by the P-GW and notifying the IPSec source UDP port number to the fixed broadband access network.

6. The method according to claim 1, further comprising:
the P-GW notifying the source UDP port number of the DSMIPv6 binding update signaling to the PCRF after the user equipment or the P-GW itself triggers to delete the Child IPSec security association; and
the PCRF notifying the source UDP port number of the DSMIPv6 binding update signaling to the fixed broad Band access network, to replace the IPSec source UDP port number.

7. The method according to claim 1, wherein,
in the step of notifying a source UDP port number of the DSMIPv6 binding update signaling to a PCRF, the P-GW further notifies the IPSec source UDP port number to the PCRF; and
the PCRF notifies the source UDP port number of the DSMIPv6 binding update signaling to the fixed broadband access network after analyzing and acquiring that the IPSec capsulation is not performed on the user plane data of the user equipment.

8. The method according to claim 1, wherein, in the step of notifying a source UDP port number of the DSMIPv6 binding update signaling to a PCRF, the P-GW further notifies the IPSec source UDP port number to the PCRF, and notifies the PCRF that the IPSec capsulation is not performed on the user plane data of the user equipment; and
the PCRF notifies the source UDP port number of the DSMIPv6 binding update signaling to the fixed broadband access network after acquiring that the IPSec capsulation is not performed on the user plane data of the user equipment.

9. The method according to claim 1, wherein, the step of the PCRF notifying the source UDP port number of the DSMIPv6 binding update signaling to a fixed broadband access network comprises:
when the PCRF does not establish the gateway control session yet, sending message of establishing the gateway control session to the fixed broadband access network, wherein, the message carries the source UDP port number of the DSMIPv6 binding update signaling; and
when the PCRF has established the gateway control session, notifying the source UDP port number of the DSMIPv6 binding update signaling to the fixed broadband access network through the gateway control session.

10. The method according to claim 2, wherein, the step of the PCRF notifying the source UDP port number of the DSMIPv6 binding update signaling and the IPSec source UDP port number to the fixed broadband access network comprises:
when the PCRF does not establish the gateway control session yet, sending message of establishing the gateway control session to the fixed broadband access network, wherein, the message carries the source UDP port number of the DSMIPv6 binding update signaling and the IPSec source UDP port number; and
when the PCRF has established the gateway control session, notifying the source UDP port number of the DSMIPv6 binding update signaling and the IPSec source UDP port number to the fixed broadband access network through the gateway control session.

11. A packet data network gateway, comprising a processor, configured to:
receive a Mobile IPv6 support for Dual Stack Hosts and Routers (DSMIPv6) binding update signaling,
analyze the DSMIPv6 binding update signaling; and
notify a source User Datagram Protocol (UDP) port number of the DSMIPv6 binding update signaling to a Policy and Charging Rules Function (PCRF);
wherein, the processor is further configured to notify the IPSec source UDP port number to the PCRF after the packet data network gateway triggers to establish a child IPSec security association;
the packet data network gateway (P-GW) further comprising a memory coupled to the processor, configured to sore the source UDP port number of the DSMIPv6 binding update signaling obtained and the IPSec source UDP port number obtained.

12. The packet data network gateway according to claim 11, wherein,
the information sending unit is further configured to notify an Internet protocol security (IPSec) source UDP port number to the PCRF when notifying the source UDP port number of the DSMIPv6 binding update signaling to the PCRF.

13. The packet data network gateway according to claim 11, wherein,
the processor is further configured to notify the source UDP port number of the DSMIPv6 binding update signaling to the PCRF after the user equipment or the packet data network gateway deletes the Child IPSec security association.

14. An IP Edge, used as a network element of a fixed broadband network access network, comprising a processor configured to:
receive a source User Datagram Protocol (UDP) port number of a Mobile IPv6 support for dual stack Hosts and Reuters (DSMIPv6) binding update signaling from a policy and charging rules function (PCRF); and
perform identification and policy control on user plane data according to the source UDP port number of the DSMIPv6 binding update signaling obtained;
wherein,
the processor is further configured to receive an internet protocol security (IPSec) source UDP port number; and
the processor is further configured to perform identification and policy control on the user plane data according to the IPSec source UDP port number obtained; the IP edge further comprising a memory coupled to the processor, configured to store the source UDP port number of the DSMIPv6 binding update signaling obtained and the IPsec source UDP port number obtained.

15. The IP Edge according to claim 14, wherein,
the processor is configured to obtain the source UDP port number of the DSMIPv6 binding update signaling or the IPSec source UDP port number from the PCRF directly or through a broadband policy control framework (BPCF).

* * * * *